United States Patent [19]

Tsumura

[11] Patent Number: 5,179,584
[45] Date of Patent: Jan. 12, 1993

[54] AUTOMATIC BILLING SYSTEM CONTROLLER

[75] Inventor: Mihoji Tsumura, Osaka, Japan

[73] Assignee: Ricos Co., Ltd., Osaka, Japan

[21] Appl. No.: 786,260

[22] Filed: Nov. 1, 1991

[30] Foreign Application Priority Data

Nov. 1, 1990 [JP] Japan .................................. 2-298554

[51] Int. Cl.$^5$ ........................................... H04M 15/00
[52] U.S. Cl. .................................... 379/114; 379/119; 379/121; 379/126; 379/130
[58] Field of Search ................ 379/121, 114, 119, 124, 379/126, 130

[56] References Cited

U.S. PATENT DOCUMENTS 5,065,393 11/1991 Sibbitt et al. ......................... 379/114

*Primary Examiner*—Stafford D. Schreyer

[57] ABSTRACT

The invention presupposes the operation by a telephone company of an automatic billing system which incorporates a means of calculating a utilization charge in accordance with the number of seconds during which a user who has called a special number is connected to that number, and then of adding the utilization charge to the user's call charge. At the user's end the invoice charge data is input and the number of seconds of connection to a special line number are set in accordance with the invoice charge and a network control means then connects with the special line number for the number of seconds which has been set. The telephone exchange's utilization charge computation means then adds the utilization charge to the call charge for collection from the user. In this way the telephone company is able to collect an invoice charge on behalf of the supplier of the corresponding service.

13 Claims, 3 Drawing Sheets

AUTOMATIC BILLING SYSTEM CONTROLLER

BACKGROUND OF THE INVENTION

1. FIELD OF THE INVENTION

The invention relates to a controller which is able, through the medium of an automatic billing system whereby a user can be billed for a composite charge made up of the combined total of a call charge and a special utilization charge, to issue a bill for an invoice charge which has arisen despite the fact that the user has not made use of a telephone line.

2. DESCRIPTION OF THE PRIOR ART

There are known automatic billing systems which function in such a way that if, for example, an information provision device, which has been installed on the premises of an information provider and listed as a special line number, is called up by a user and information subsequently obtained from said information provision device by way of a telephone line, a utilization charge computation means, which has been installed in a telephone exchange which stands between the information provider and the user, counts the number of seconds during which the user is connected with the information provider in order to compute a utilization charge which is then added by the telephone company to the user's call charge and the resultant composite charge ultimately collected from the user. The use of this sort of automatic billing system enables the telephone company to collect the utilization charge on behalf of the information provider and this in turn relieves the information provider of the burden of carrying out his own bill collection work. In this sort of case, however, the system can only be used for the computation of a utilization charge in cases where the user has obtained his service by way of a telephone line and it is not, therefore, available for the billing of invoice charges which have arisen in some other way. For example, if a user becomes liable to a charge which has arisen through his use of some sort of service which has not required the intermediation of a telephone line, the telephone company's utilization charge computation means will not be called into operation with the result that the supplier of the service cannot make use of the aforementioned automatic billing system as a means of collecting the resultant charge.

SUMMARY OF THE INVENTION

The invention has been devised with this sort of problem in mind and the specific object of the invention is to enable an automatic billing system of the type outlined above to be used for the collection of invoice charges which arise without the use of a telephone line. The achievement of the object of the invention presupposes the operation by a telephone company of an automatic billing system which incorporates a means of calculating a utilization charge in accordance with the number of seconds during which a user who has called a special number is connected to that number, and then of adding the utilization charge to the user's call charge. The invention as it is configured on the user's premises comprises a network control means which carries out connection and disconnection with special line numbers, a call time computation means which is used for the input of invoice charge data and the subsequent setting, in accordance with said invoice charge data, of the number of seconds that the user is connected to a special line number and a connection control means which receives the output of the call time computation means and then operates the network control means in such a way that a connection is made with the special line number for the number of seconds that have been specified. Using this configuration, the call time computation means sets the number of seconds that the user is connected to the special line number in accordance with the invoice charge and the connection control means operates the network control means in such a way that connection is made with the special line number for the number of seconds that have been specified. This enables the telephone company's utilization charge computation means to be used to compute a utilization charge in accordance with the number of connection seconds and thereafter to add this charge to the user's call charge and finally to bill the user for the resultant composite charge. The aforementioned automatic billing system can in this way be used to bill a user for an invoice charge which has arisen without the user having made use of a telephone line. Moreover, by preparing a plurality of special line numbers each of which differs from the others in terms of the user charge per unit of time, and then using the call time computation means to set the number of connection seconds with each of the different special line numbers in such a way as to minimize the total number of connection seconds, the call charge can be kept to a minimum.

DETAILED DESCRIPTION OF THE PREFERRED EMBODIMENTS

First preferred embodiment

Figure 1A:
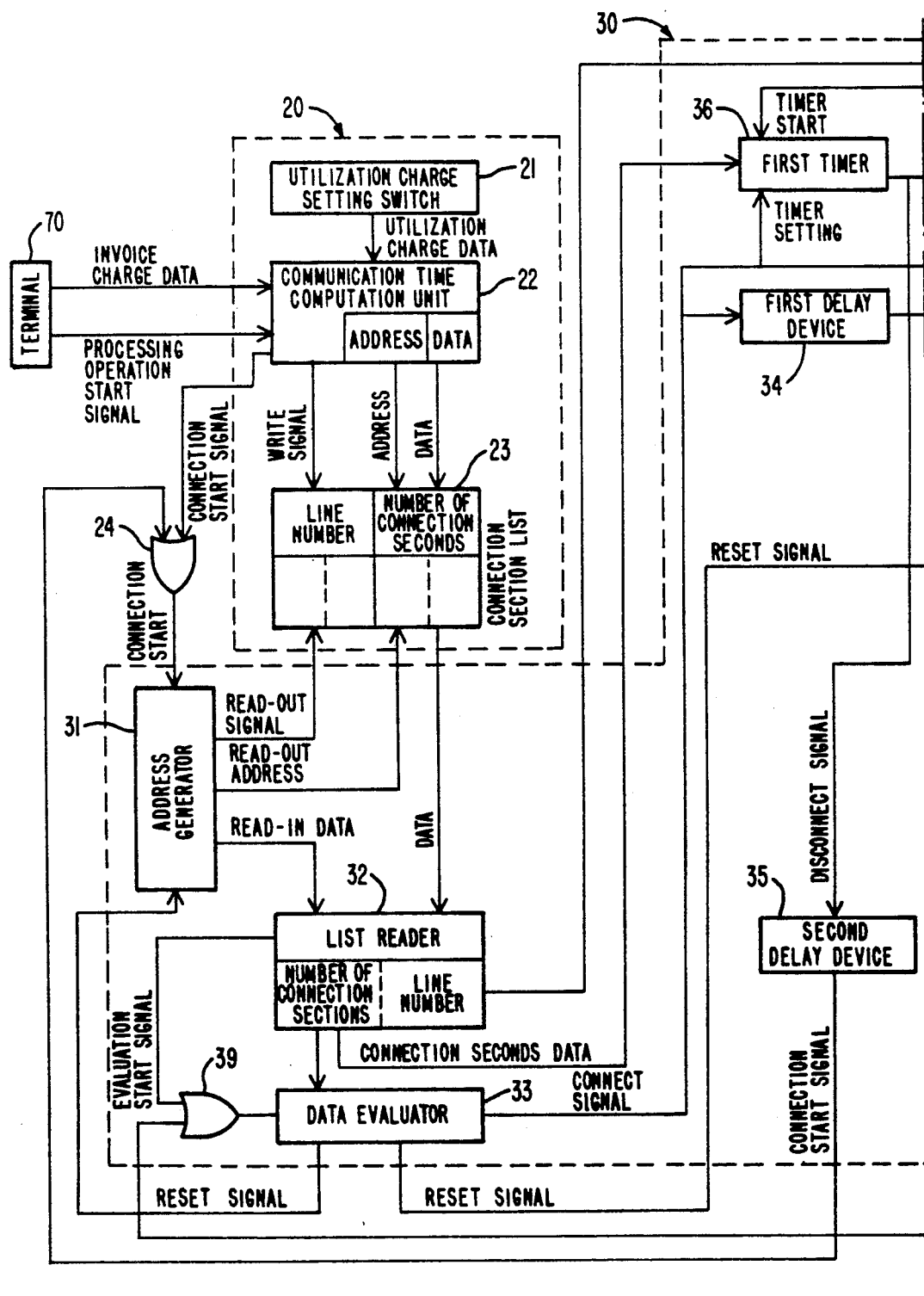
FIG. 1 is a block diagram illustrating the overall configuration of the first preferred embodiment.

There follows a detailed description of the first preferred embodiment of the invention by reference to the accompanying drawing.

The automatic billing system will be described first. 50 is a telephone company's telephone exchange which has been fitted with a utilization charge computation means (not included in the drawing) which computes a utilization charge in accordance with the call time (connection time) when a user calls up a special line number and then adds this to the user's call charge. The user is then billed for the call charge and the utilization charge. The user, on the other hand, has a digital karaoke system 70 installed on his premises. A telephone line 60 connects the user's premises to the telephone company 50. Digital karaoke systems 70 may installed on the premises of a plurality of users by, for example, a company which supplies a karaoke service and which imposes a charge in return for said service. In the first preferred embodiment, the digital karaoke system 70 service charge is deemed to be the invoice charge which data is transmitted from the digital karaoke system 70 to the telephone company's 50 utilization charge computation means and then subsequently billed to the user as a service charge. The functions of each of the blocks and other system elements installed on the user's premises will now be described.

<1> NCU (10)

The NCU 10 is a network control means which is connected to a telephone line 60 and which has the function of connecting and disconnecting the special line numbers. The NCU 10 circuits are the same as those of a known network control unit.

<2> Call time computation means (20)

The call time computation means 20 has the function of inputting invoice charge (service charge) data and of setting the number of seconds for connection to the special line number in accordance with said invoice charge. Said call time computation means 20 comprises a utilization charge setting switch 21, a communication time computation unit 22 and a connection seconds list 23. The utilization charge setting switch 21 is used to set and store in memory a plurality of special line numbers along with the unit time utilization charges which apply to each of said line numbers. The communication time computation unit 22 receives utilization charge data from the utilization charge setting switch 21 along with invoice charge data and a processing operation start signal from the digital karaoke system 70 and outputs the line number and the number of connection seconds. In the present embodiment the utilization charge for each of the line numbers differs being 10 yen/second, 100 yen/second and so on.

The connection seconds list 23 holds each line number along with the appropriate number of connection seconds on a single line of memory. Each of the line numbers and the corresponding connection times are set in such a way that the product of the utilization charge multiplied by the total number of connection seconds for each line number constitutes the aforementioned invoice charge while at the same time minimizing the total number of connection seconds. Finally, connection seconds data of zero seconds is written into the list.

24 is an OR circuit which takes the logical sum of the connection start signal from the communication time computation unit 22 and the connection start signal from the second delay device 35.

<3> Connection control means (30)

The function of the connection control means 30 is to receive the output of the call time computation means 20 and subsequently to control the NCU 10 in such a way that connections are made to each of the requisite line numbers for the appropriate number of connection seconds. The connection control means 30 comprises an address generator 31, a list reader 32, a data evaluator 33, the first and second delay devices 34, 35, the first and second timers 36, 37, a bypass switch 38, a command encoder 44, a command transmitter 45, a command receiver 46 and a command decoder 47.

The address generator 31 is activated by receipt of a connection start signal from the communication time computation unit 22. As soon as the power is switched on, the address generator 31 indicates the first address on the connection seconds list 23. On receipt of a connection start signal, said address generator 31 updates said first address and sends out a read-out signal to the connection seconds list 23 and a read-in signal to the list reader 32. After reading one line of data (line number and number of connection seconds), the address generator 31 then assumes standby mode while at the same time indicating the address of the next line entry on the connection seconds list 23. When the line entry data for each line on the connection seconds list has been read out and a reset signal is received, the address generator 31 is then reset to the first address on the connection seconds list after which it assumes the standby mode.

The list reader 32 outputs each of the line number and the number of connection seconds, which it has read from the connection seconds list 23, to its respective port and then outputs an evaluation start signal to the data evaluator 33. The output port data is held until such time as the next piece of new data is read in. In cases where the number of connection seconds read into the list reader 32 is zero, the data evaluator 33 determines that this is the last item of data and issues a reset signal. In all other cases said data evaluator 33 issues a connect signal.

The first timer 36 determines the number of connection seconds to a special line number. Connection seconds data is input to the first timer 36 from the list reader 32 and the timer is subsequently set by the connect signal output by the data evaluator 33. The timer is then triggered by a connect confirmation signal from the command decoder 47 and starts the count operation. When the preset number of connection seconds has been reached, a disconnect signal is sent to the command encoder 44.

The second delay device 35 is a timer which carries out the next connect operation after having allowed enough time to elapse for the completion of the preceding disconnect operation. After a disconnect signal has been input and the required delay time has elapsed, a connection start signal is then output by way of the OR circuit 24 to the address generator 31.

The bypass switch 38 is used as a means of bypassing the first delay unit 34, except in case of error as will be explained in more detail below.

The command encoder 44 receives a connect signal or a disconnect signal which it then converts into either a connect command or a disconnect command. The command transmitter 45 receives said connect or disconnect command and then either connects or disconnects the NCU 10.

Depending on whether the NCU 10 has performed a connect or a disconnect operation, the command receiver 46 will issue either a connect or a disconnect command. On receipt of the connect or disconnect command, the command decoder 47 converts each one to a connect signal or a disconnect signal respectively.

Next, there follows a description of the functional elements which are activated in the event of an error which results in a line connection failure. In the event of an error, a fixed period of time is allowed to elapse and then the connect operation is repeated. The timer which determines said fixed period of time is the first delay device 34. The connect signal which has been input is output again after the required delay time has elapsed. In the absence of an error signal the first delay device 34 is cut out of the circuit with the help of the bypass switch 38.

If, after a fixed period of time has elapsed following the transmission of a connect signal, a connect confirmation signal has not been received, then this will be deemed to be a connection failure and the same connect operation procedure will be repeated. The fixed period of time in question is determined by the second timer 37. After the connect signal has been received and the counter reset, the count starts again immediately. The count is subsequently halted on receipt of the connect confirmation signal. There is also a level output which enables the switching of the bypass switch 38. The level output is maintained until such time as it is reset.

The bypass switch 38 terminates the bypass function on receipt of an error signal (level) from the second timer 37, and connects the first delay device 34.

Figure 1B:
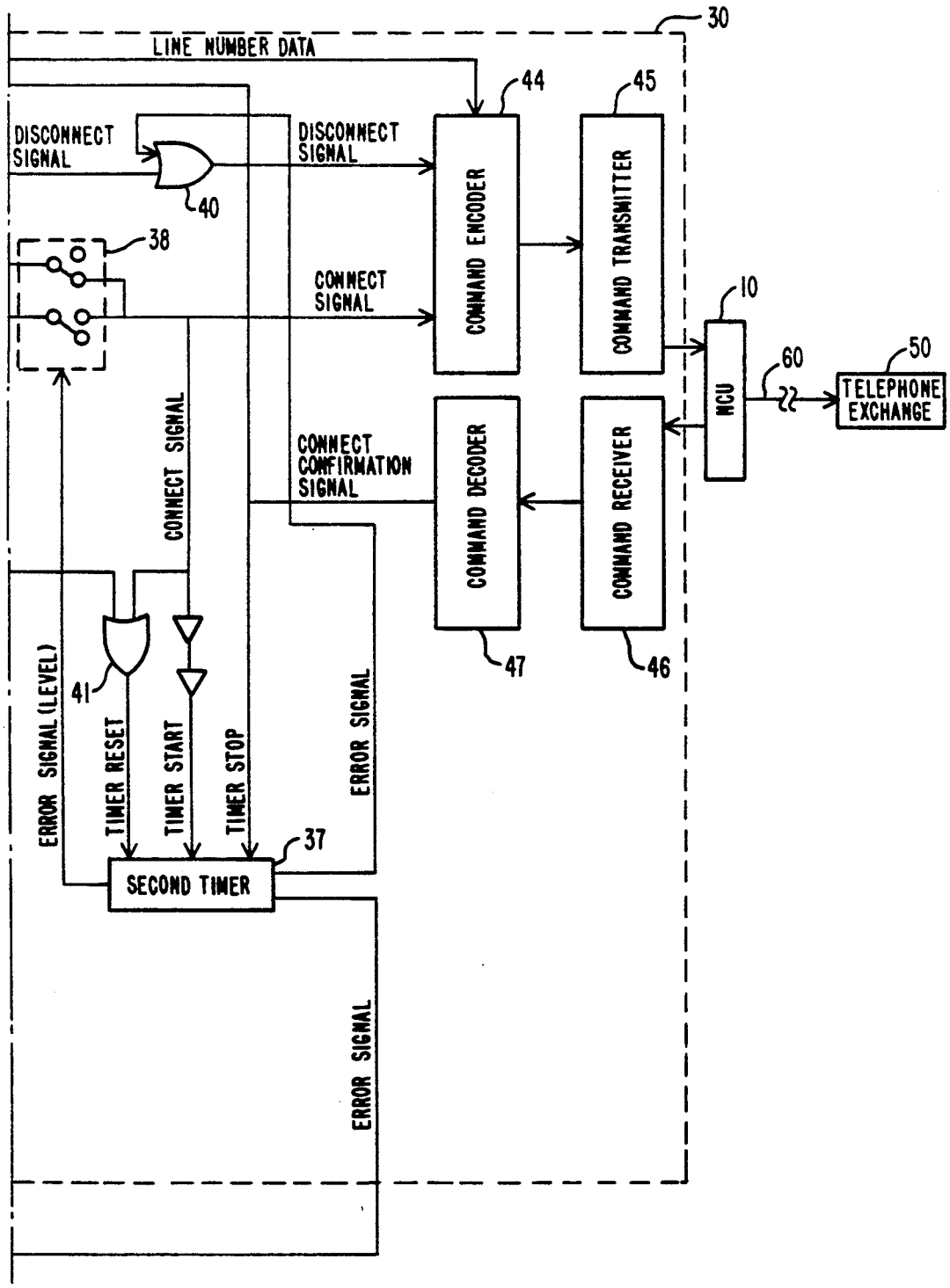

Moreover, 39 in FIG. 1 is an OR circuit which takes the logical sum of the evaluation start signal from the list reader 32 and the error signal from the second timer 37, 40 is an OR circuit which takes the logical sum of the disconnect signal from the first timer 36 and the error signal from the second timer 37 and 41 is an OR circuit which takes the logical sum of the reset signal from the data evaluator 33 and the connect signal from the bypass switch 38.

Figure 2:
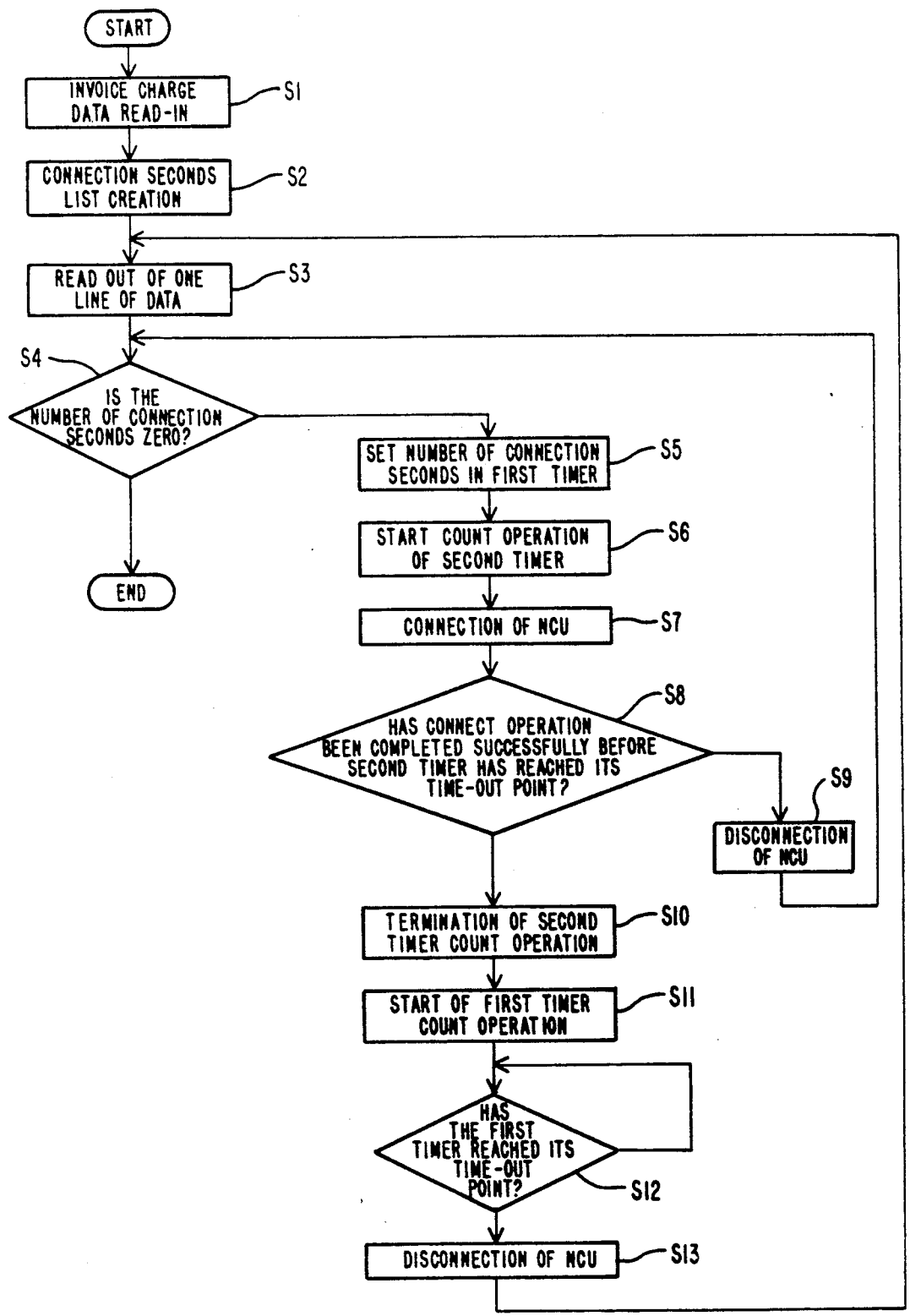
FIG. 2 is a flow chart clarifying the mode of operation of the first preferred embodiment.

Next, there follows a description of the overall mode of operation of the first preferred embodiment by reference to the flow chart in FIG. 2. When the system has been activated, the procedure starts at step S1 with the reading of the invoice charge data. More specifically, when the processing operation start signal is sent at the specified time from the digital karaoke system 70 to the communication time computation unit 22, the invoice charge data is read from the digital karaoke system 70 into the communication time computation unit 22.

At step S2 the utilization charge and the number of connection seconds are computed for each of the line numbers and a connection seconds list created. The last data item entered on the connection seconds list is zero seconds. At step S3 the first line of data is read out. More specifically, when the writing of the aforementioned data has been completed, a connection start signal is sent to the address generator 31. On receipt of said connection start signal, the read-out address and read-out signal are output from the address generator 31 to the connection seconds list 23. When sufficient time has been allowed for the reading of the data, the address generator 31 outputs a read-in signal to the list reader 32. When one line of data (line number and number of connection seconds) has been read in, the list reader 32 outputs the line number and the number of connection seconds to their respective output ports, and maintains the status. At step S4 it is determined whether the connect signal is zero or not. In other words, after the number of connection seconds have been output and the evaluation start signal is output from the list reader 32 to the data evaluator 33, said data evaluator 33 reads the number of connection seconds and determines whether that number is zero or not. If the result of the evaluation process is a NO response, thereby indicating that the number is something other than zero, a connect signal is output from the data evaluator 33 and the procedure advances to step S5 at which point the number of connection seconds are set in the first timer 36. Next, at step S6 the second timer 37 is reset by the connect signal and the count is started immediately. At step S7 the NCU 10 is connected. The connect signal itself is normally input directly into the command encoder 44 by way of the bypass switch 38. On receipt of the connect signal, the command encoder 44 accesses the line number in the list reader 32 and issues the connect command to the NCU 10 by way of the command transmitter 45. Next, at step S8, before reaching its time-out point, the second timer 37 determines whether the line connection has been successfully completed or not. The determination that the connection has been successfully completed is made on the basis of the return of the connect confirmation signal from the NCU 10 by way of the command receiver 46 and the command encoder 44. If it is determined that the line connection has been completed successfully before the second timer 37 reaches its time-out point, then the procedure advances to step S10 at which the count operation of the second timer 37 is halted by receipt of the connect confirmation signal.

Next, at step S11 the count operation of the first timer 36 is initiated. At step S12 the system remains on standby until the first timer 36 reaches its time-out point at which point the procedure moves on to step S13 at which a disconnect signal is issued to the command encoder 44. On receipt of said disconnect signal, the command encoder 44 issues a disconnect signal to the NCU 10 by way of the command transmitter 45. On receipt of said disconnect signal, the NCU 10 disconnects the line which is currently connected. At this point the procedure returns to step S3 at which the next line of data is read in. The procedure described above is then repeated from step S4 onwards. In other words, the disconnect signal is input to the second delay device 35 and then, after sufficient time has been allowed for the NCU 10 to complete the line disconnect operation, said disconnect signal is output again to the address generator 31 in the form of a new connection start signal. On the other hand, if it is determined at step S8 that the line connection has not been completed successfully before the second timer 37 reaches its time-out point, then a connection error resulting in a line connection failure will be deemed to have occurred and, after a fixed period of time has been allowed to elapse, the connection procedure will be repeated. In other words, the second timer 37 outputs an error signal (level), thereby causing the bypass switch 38 to open while at the same time connecting the first delay device 34. The error signal is also input to the data evaluator 33 in the form of an evaluation start signal. At step S9 the error signal is also input to the command encoder 44 in the form of a disconnect signal. Said disconnect signal does not, moreover, go by way of the second delay device 35. To be on the safe side, therefore, on receipt of the disconnect signal, the command encoder 44 outputs the corresponding disconnect command to the NCU 10 by way of the command transmitter 45 after which the NCU 10 disconnects the line. The procedure then returns to step S4 at which, at the end of the specified delay time, the connection procedure is carried out again. At this point the output port of the list reader 32 is still maintaining the same data as it was prior to the failure of the line connect operation.

If, during the course of subsequent repetitions of the procedural steps from step S3 to step S13, final data is read in then it will be determined at step S4 that the connect signal is zero and the procedure will be terminated at that point. To be more precise, the data evaluator 33 will determine that the number of connection seconds is zero and that all connections to external lines have thus been completed, whereupon it will issue a reset signal to both the address generator 31 and the second timer 37. The output of said reset signal causes the controller to assume standby mode until such time as the next invoice charge data is received.

Thus, in the first preferred embodiment, a call time computation means 20 is used to set the number of seconds of connection time with a special line number on the basis of the digital karaoke system invoice charge and the user is then connected with the special line number for the specified number of seconds. At the same time a utilization charge computation means, which is installed in the telephone exchange, computes the appropriate utilization charge which is then billed direct to the user, thereby relieving the karaoke service company which has imposed the charge of the inconvenience of billing the user and collecting the charge from him.

In this case the number of connection seconds of each of the special lines is set such that the total number of connection seconds is kept to the minimum, thereby reducing overall call costs.

Furthermore, the first preferred embodiment called for the use of an NCU as a network control means but any sort of device may, in fact, be used in place of an NCU providing it incorporates a function whereby it is able to connect and to disconnect the system to and from a special line number. The first preferred embodiment is also based on the assumption that the service provided, and for which the user is billed, is a digital karaoke service. The invention can, however, be used for the collection of a wide range of service charges other than those specifically relating to digital karaoke services. The invention can also be applied to the collection of a variety of other charges other than service charges.

Second preferred embodiment

In the first preferred embodiment an invoice charge arising out of the use of a digital karaoke system 70 installed on the user's premises was input directly into a communication time computation unit 22. In the second preferred embodiment, however, an invoice charge arising in a location quite distinct from that of the user but as a direct result of an action (use of a digital karaoke system 70, for example) taken by said user, is input to a communication time computation unit 22 which is installed on the user's premises. To be more precise, an invoice charge setting device which is used to input invoice charges, an encoder which receives output from said invoice charge setting device which it subsequently encodes in the form of a processing operation start signal and an invoice charge and an NCU, which is connected to both an encoder and a telephone line, are all installed on the premises of the invoicing party. The aforementioned digital karaoke system 70 is, moreover, not installed on the user's premises but in its stead are installed an NCU, which connects with the telephone line 60 referred to above, and a decoder, which is connected to each of said NCU and the aforementioned communication time computation unit 22. In all other respects the configuration of the second preferred embodiment is identical to that of the first preferred embodiment.

In the second preferred embodiment the utilization charge setting switch 21 and the communication time computation unit 22 are both deemed to have been installed on the user's premises as in the first preferred embodiment. There is, however, no reason why these elements should not equally be located on the invoicing party's premises if so desired.

Third preferred embodiment

In the third preferred embodiment an information provider's premises are fitted with a information provision device from which a user is able to obtain information by way of an ordinary telephone line (a line in respect of which only call charges apply). Said information provider's premises are also fitted with an invoice charge computation device which counts the time during which said information provision device is being utilized by the user and computes the corresponding invoice charge, an encoder which receives output from said invoice charge computation device which it subsequently encodes in the form of a processing operation start signal and an invoice charge and an NCU, which is connected to both the encoder and a telephone line. The aforementioned digital karaoke system 70 is, moreover, not installed on the user's premises but in its stead are installed, as in the second preferred embodiment described above, an NCU, which connects with the telephone line 60 referred to above, and a decoder, which is connected to each of said NCU and the aforementioned communication time computation unit 22. In all other respects the configuration of the third preferred embodiment is identical to that of the first preferred embodiment. In the third preferred embodiment the utilization charge setting switch 21 and the communication time computation unit 22 are both deemed to have been installed on the user's premises as in the first preferred embodiment. There is, however, no reason why these elements should not equally be located on the invoicing party's premises if so desired. It would also be possible for the processing operation start signal to be output at regular intervals (say once a month or at 10.00 a.m. each day, for example).

What is claimed is:

1. An automatic billing system controller responsive to invoice charge data and being in electrical communication with utilization charge computation means installed in a telephone exchange, said utilization charge computation means computing a call charge for a user including a utilization charge being computed as a function of total time the user is connected to the telephone exchange, the automatic billing system controller comprising:

first network control means located with the user and in electrical communication with the telephone exchange for connecting the billing system controller to the telephone exchange;

call time computation means having inputs responsive to the invoice charge data for storing a plurality of special line numbers, said special line numbers representing different units of time utilization charges, and computing periods of time associated with selected special line numbers as a function of the invoice charge data; and connection control means located with the user for connecting the first network control means to selected special line numbers for the periods of time associated with respective special line numbers whereby the telephone exchange is connected to the automatic billing system controller for a total time equal to the sum of the periods of time.

2. The automatic billing system controller of claim 1 wherein a different unit time utilization charge applies to each of the plurality of special line numbers and said call time computation means computes the periods of time for each special line so as to minimize the total time of connection to the telephone exchange.

3. The automatic billing system controller of claim 2 wherein said call time computation means further comprises:

utilization charge setting means for storing the plurality of special line numbers and unit time utilization charges for the plurality of special line numbers;

a communication time computation unit responsive to both said unit time utilization charges and the invoice charge data for determining a number of seconds of connection of each of the special line numbers whereby a total of the products of the unit time utilization charges multiplied by the respective numbers of seconds of connection for each special line number is equal to the invoice charge data and whereby the total number of seconds of connection is minimized; and a means for storing said special line numbers and the numbers of seconds of connection associated with each of said special line numbers.

4. The automatic billing system controller of claim 3 wherein the invoice charge data is input by the user.

5. The automatic billing system controller of claim 4 wherein the invoice charge data represents a service charge for a digital karaoke system located with the user.

6. The automatic billing system controller of claim 3 wherein the invoice charge data is input by an invoicing party.

7. The automatic billing system controller of claim 6 further comprising:

means for setting the invoice charge data;

means connected to said invoice charge setting means for encoding the invoice charge data;

second network control means connected to the encoding means, said encoder means and second network control means being located with the invoicing party;

third network control means in electrical communication with the second network control means; and decoder means responsive to the third network control means and connected to the communication time computation unit, said third network control means and decoding means being located with the user.

8. The automatic billing system controller of claim 7 wherein said invoice charge setting means and said communication time computation unit are located with the user.

9. The automatic billing system controller of claim 7 wherein said invoice charge setting means and said communication time computation unit are located with the invoicing party.

10. The automatic billing system controller of claim 6 further comprising:

invoice charge setting means for counting an invoice charge;

an encoder connected to said invoice charge setting means for producing a processing operation start signal and an invoice charge;

fourth network control means connected to the encoder, said encoder and fourth network encoding means being located with the invoicing party;

fifth network control means in electrical communication with the fourth network control means; and a decoder responsive to the fifth network control means and connected to the communication time computation unit, said fifth network control means and decoder being located with the user.

11. The automatic billing system controller of claim 10 wherein said invoice charge setting means and said communication time computation unit are located with the user.

12. The automatic billing system controller of claim 10 wherein said invoice charge setting means and said communication time computation unit are located with the invoicing party.

13. The automatic billing system controller of claim 10 wherein the processing operation start signal arises at fixed intervals.

* * * * *